United States Patent [19]

Bacardit

[11] Patent Number: 4,474,256

[45] Date of Patent: Oct. 2, 1984

[54] HYDRAULIC POWER-ASSISTED ACTUATING MECHANISM, ESPECIALLY FOR THE SERVO-ASSISTED STEERING SYSTEM OF A MOTOR VEHICLE

[75] Inventor: Juan S. Bacardit, Barcelona, Spain

[73] Assignee: Bendiberica S.A., Barcelona, Spain

[21] Appl. No.: 419,153

[22] Filed: Sep. 17, 1982

[30] Foreign Application Priority Data

Sep. 23, 1981 [ES] Spain ............................... 506437

[51] Int. Cl.³ .............................................. B62D 5/10
[52] U.S. Cl. .................................. 180/149; 91/376 A; 180/152
[58] Field of Search ..................... 180/149, 141, 152; 91/375 R, 376 A

[56] References Cited

U.S. PATENT DOCUMENTS

| | | | |
|---|---|---|---|
| 2,410,049 | 10/1946 | Davis | 180/147 |
| 2,828,641 | 4/1958 | Larsen | 180/149 |
| 2,869,665 | 1/1959 | Beck | 180/149 |
| 3,967,541 | 7/1976 | Born et al. | 91/376 A |

FOREIGN PATENT DOCUMENTS 55-127259 10/1980 Japan .................................... 180/149
1576153 10/1980 United Kingdom .

Primary Examiner—David M. Mitchell
Assistant Examiner—D. Lynn Fugate
Attorney, Agent, or Firm—Larry J. Palguta; Paul D. Schoenle; Ken C. Decker

[57] ABSTRACT

The actuating mechanism comprises a step-up transmission having an input member (8, 9) connected to an actuation control system (13) by means of a hydraulic distributor (12) controlling at least one double-acting hydraulic power-assistance motor, and an output member in the form of a disc-shaped body (6) rotating about an axle (5) in a box (1, 3), the body having a toothed sector (7) intermeshing directly with a pinion (8) of the input member (9) and forming, in the box, the piston means of the power-assistance motor.

5 Claims, 10 Drawing Figures

FIG_1

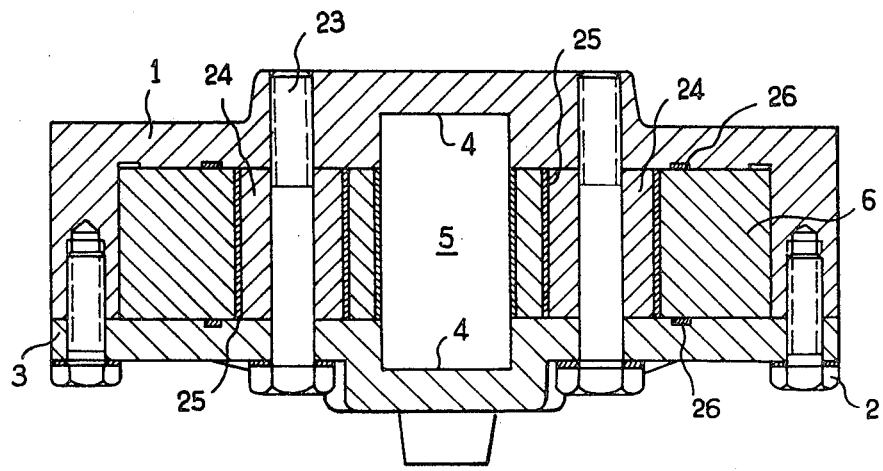
FIG_3
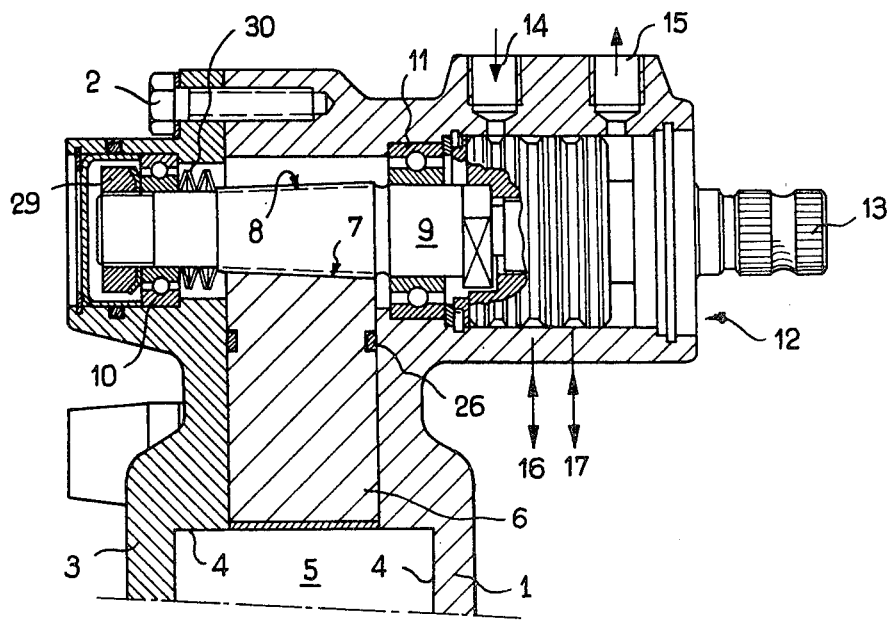
FIG_4

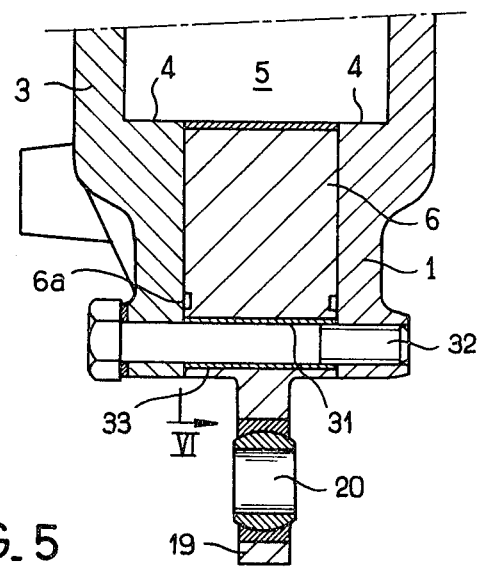
FIG_5
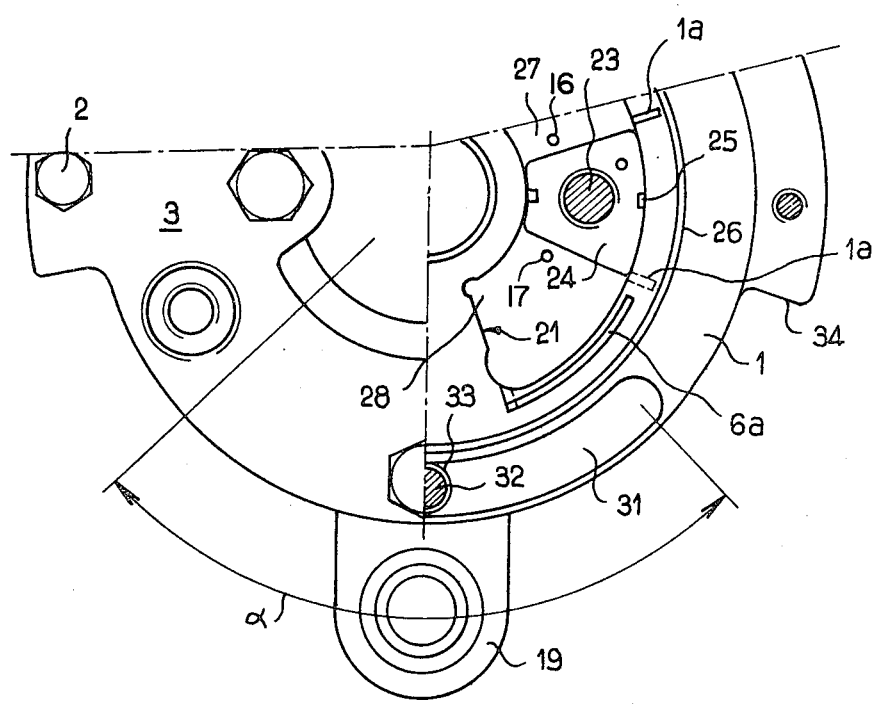
FIG_6

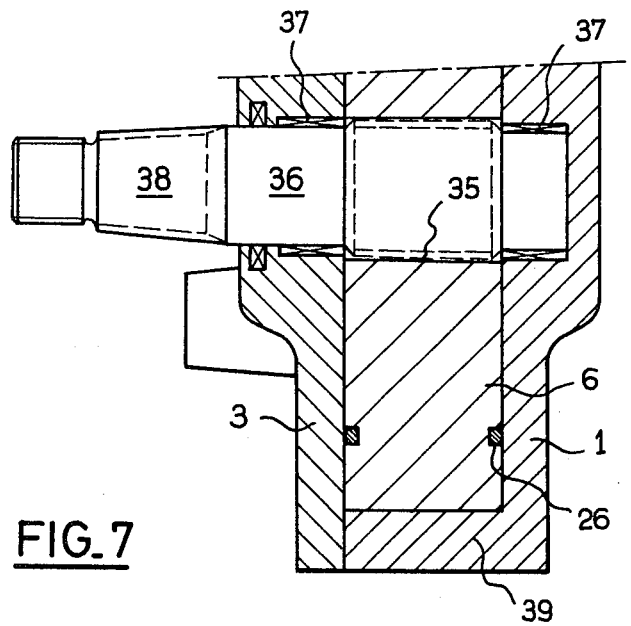
FIG_7
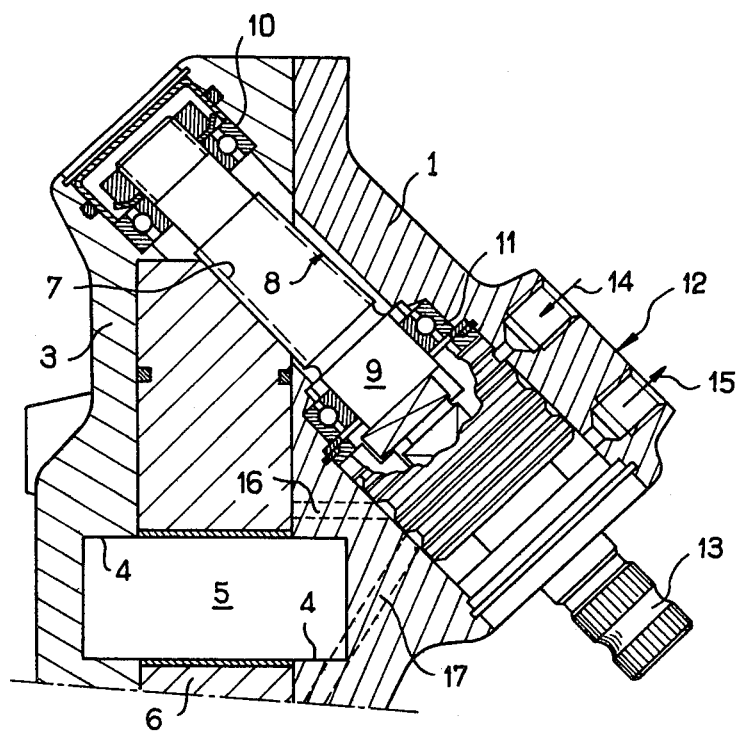
FIG_8

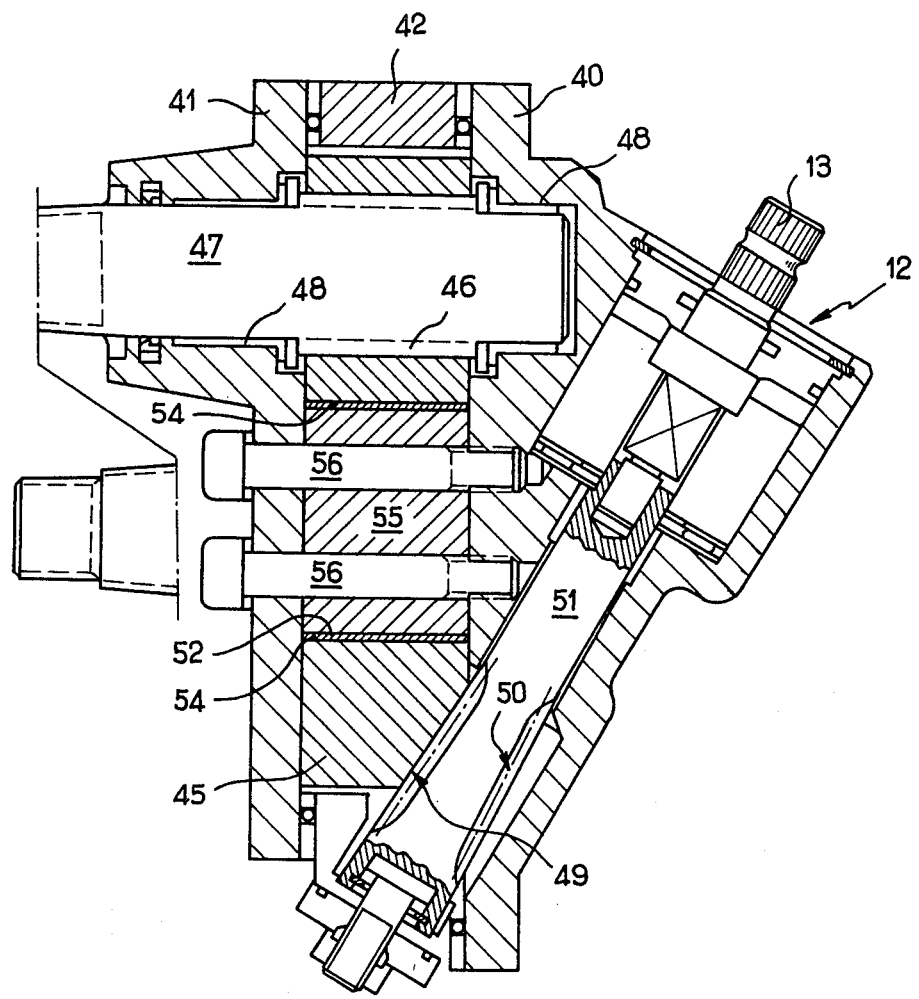
FIG_9

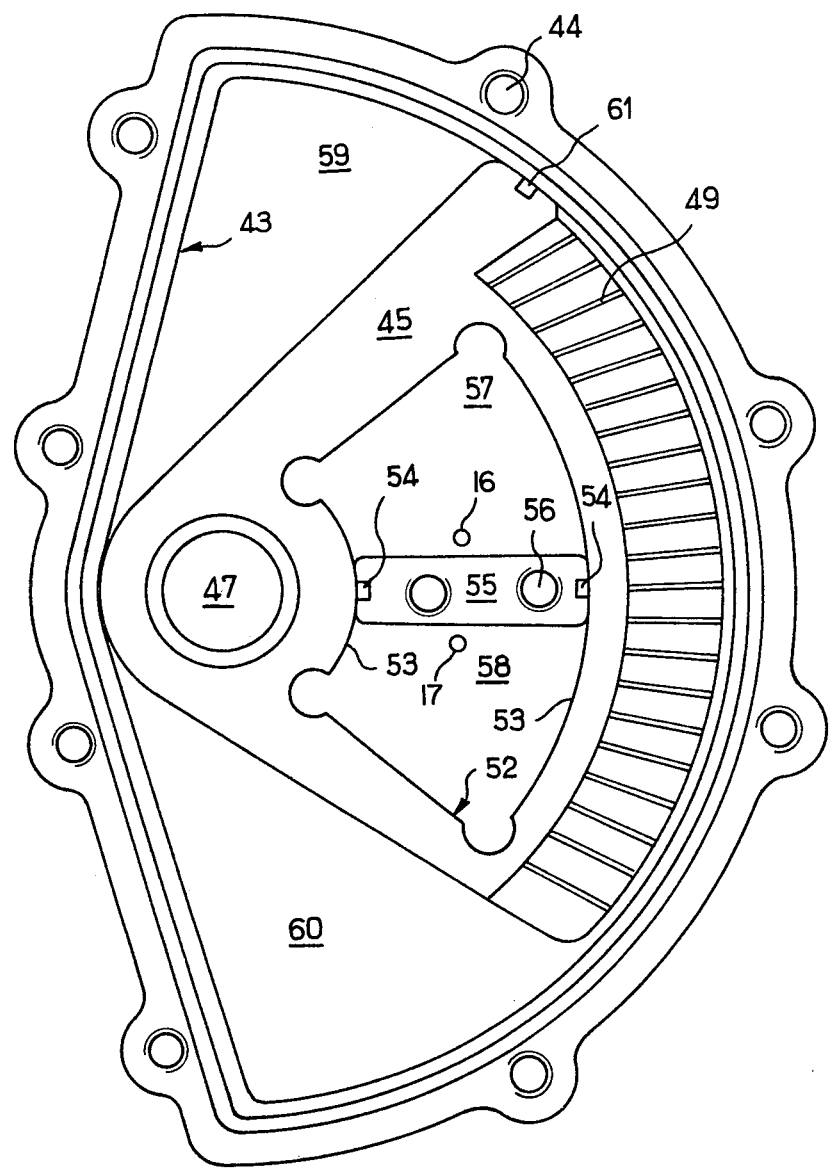
FIG_10

HYDRAULIC POWER-ASSISTED ACTUATING MECHANISM, ESPECIALLY FOR THE SERVO-ASSISTED STEERING SYSTEM OF A MOTOR VEHICLE

The present invention relates to hydraulic power-assisted actuating mechanisms, more particularly for the servo-assisted steering systems of motor vehicles, comprising a force step-up transmission having an output member intended to be connected to a driven system to be actuated (typically a steering linkage), and an input member intended to be connected to an actuation control system (typically a steering-wheel) by means of a lost-motion coupling and by means of a hydraulic distributor making use of this lost-motion to feed selectively the working chambers of at least one double-acting hydraulic power-assistance motor comprising piston means which can be coupled mechanically to the driven system.

Known arrangements of this type of actuating mechanism conventionally make use of a functional group comprising a steering box, the actuating mechanism with step-up transmission, and the hydraulic distributor controlling the operation of the actuating mechanism. A typical example of this type of arrangement is described, for example, in U.S. Pat. No. 2,410,049 or in British Pat. No. 1,576,153 in the applicant's name and comprises, in a servo-assisted steering box, a transmission input member forming a screw interacting by means of ball-bearing races with a transmission mechanism made in the form of a nut coaxial to the screw and to the distributor, the nut, which has linear displacement, forming the piston of the power-assistance motor and having rack teeth engaging with an output member consisting of a toothed sector fixed to the output shaft of the mechanism.

In these known techniques, problems arise in organizing the functional group in situ, both for reasons of bulk and as regards the respective arrangements of the input member and the output member, the distributor-screw-nut/rack assembly being directed perpendicularly to the output shaft of the mechanism.

The object of the present invention is specifically to propose a hydraulic power-assistance actuating mechanism of the type defined above, having an especially compact structure, with minimum mechanical and operational inertia, and offering a high degree of versatility as regards the respective arrangements of the input and output members of the mechanism.

For this purpose, according to a feature of the invention, in an actuating mechanism of the type defined above, the output member intermeshes directly with the input member and forms the said piston means of the power-assistance motor.

According to a more particular feature of the invention, the output member of the transmission comprises an at least partially disc-shaped body supported so as to rotate about an axle in a box, the outer faces of the body interacting in a leak-proof manner with the corresponding walls of the box, the body having peripherally a toothed sector intermeshing with a pinion of the input member.

According to one aspect of the invention, the body of the output member of the transmission has at least one aperture in the form of a ring sector which is coaxial to the said axle, and in which is located a transverse partition fixed to the box and interacting by sliding in a leak-proof manner with the cylindrical walls of the aperture so as to define in the aperture a pair of the said working chambers.

By means of such an arrangement, the output member of the transmission, made in the form of a disc or a sector rotating or pivoting in a flat box, on the one hand intermeshes directly with the input member, consisting typically of the secondary member of the distributor, with the possibility of selecting the method of meshing from a large range according to the respective orientations of the box and the distributor which it is intended to observe, and on the other hand forms itself the piston means of the power-assistance motor coupled directly to the steering linkage in a compact arrangement of low bulk and high operating reliability.

Other characteristics and advantages of the present invention will appear from the following description of various embodiments given by way of illustration and in a non-limiting way, the description being made in relation to the attached drawings in which:

FIG. 3 is a plan view in axial section taken in the plane III—III of FIG. 2;

FIG. 4 is a partial axial section through another embodiment of the transmission and the arrangement of the input member;

FIG. 5 is a partial section through the lower portion of the box and shows the arrangement of a limit-stop system for the output member of the preceding figures;

FIG. 6 is a front view in a half cross-section of the embodiment of FIG. 5;

FIG. 7 is a view similar to that of FIG. 5 and illustrates an alternative form with the output member fixed to an output shaft;

FIG. 8 is a partial section similar to FIG. 4 through another embodiment of the actuating mechanism according to the invention;

FIG. 9 is an axial section through another embodiment of the actuating mechanism provided with a sector-shaped gear wheel; and FIG. 10 is a plan view of the mechanism of FIG. 9, the box portion 40 (and the distributor) being removed.

Figure 1:
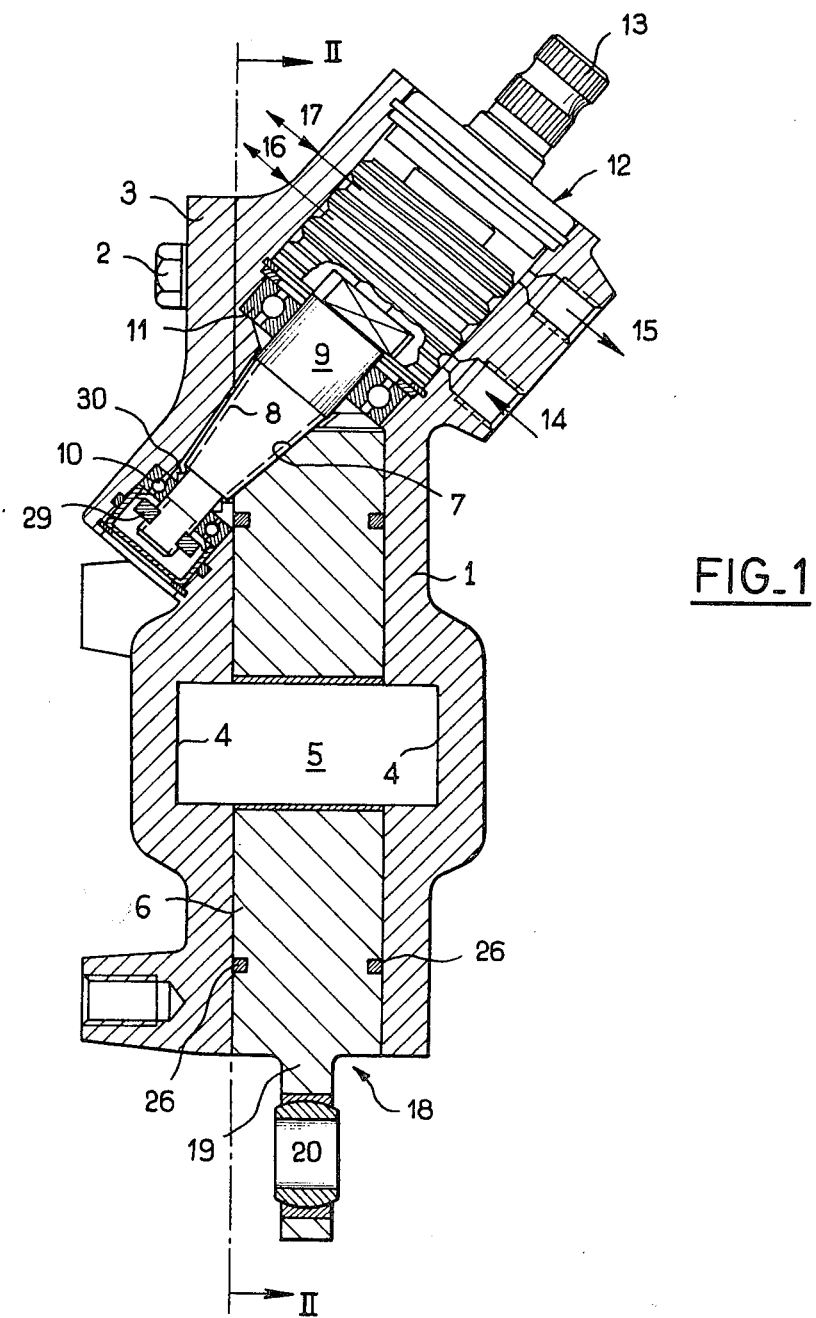
FIG. 1 is a view in axial section of a first embodiment of a power-assisted actuating mechanism according to the invention.
Figure 2:
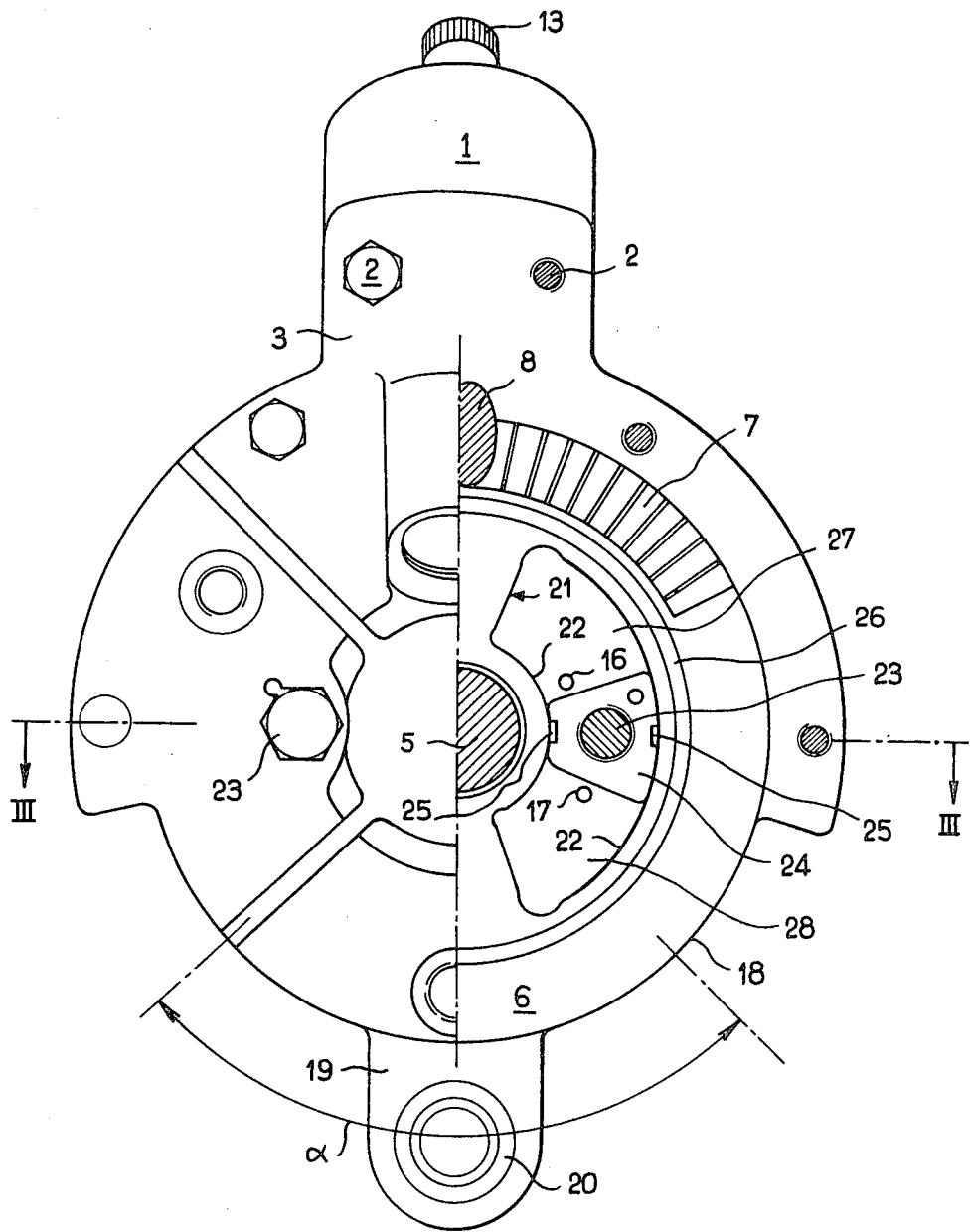
FIG. 2 is a cross-sectional view along the plane II—II of FIG. 1.

In the embodiment of FIGS. 1 to 3, the mechanism is incorporated in a box comprising a hollow box body 1 having the general shape of a flat dish defining a cylindrical cavity, the orifice of which is closed by a cover 3 by means of peripheral screws 2. The opposite inner faces of the box body 1 and of the cover 3 are parallel and are both provided, opposite one another, with coaxial central recesses 4 in which are accommodated the ends of a fixed axle 5 on which a disc-shaped gear wheel 6, equipped peripherally with a ring with conical toothing 7, opposite the cover 3 in the position shown, can rotate between the walls of the box.

The toothed-sector wheel 6 forms a force step-up transmission together with a complementary pinion 8 of the toothing 7 formed on a short axle 9, the ends of which are supported so as to rotate in bearings 10 and 11 arranged respectively in the cover 3 and in the box body 1, the wheel 6 constituting the output member of the transmission.

The axle 9 forms the secondary or output member of a hydraulic distributor power-assistance to control the chambers of a hydraulic power-assistance motor, as will be seen subsequently, the primary or input member of the distributor consisting of a splined shaft 13 intended to be connected typically to a steering-wheel. The distributor 12 can be of any known type, the inner members of which are actuated as a function of a certain lost-motion possible between the primary and secondary members. This distributor is advantageously of the rotary type with a coaxial rotor and casing or, for example, of the starshaped type described in detail in other patents of the applicant (especially British Pat. No. 1,576,153, the content of which is assumed to be incorporated here for reference) and conventionally possesses inlets and outlets 14, 15 for hydraulic control fluid and at least one pair of distribution passages 16 and 17 connected to the opposing chambers of at least one hydraulic power-assistance motor by means of pipes (not shown).

The lower portion (in the drawings) of the box body 1 and/or of the cover 3 is cut out so as to form a peripheral recess 18 exposing a sector-shaped region of the peripheral section of the toothed wheel 6 from which there projects substantially radially outwards an arm of short length 19 which is provided with a ball-and-socket joint 20 to connect it to the crank of a steering linkage.

The use of a step-up transmission with directly meshing wheel and pinion and having a pinion with reduced conicity of convergence of the type described above makes it possible to arrange the input member 9 of the transmission so that it extends in the box 1, 3 of the mechanism, forming an obtuse angle in relation to the body of the box 1. The input and output members 9 and 19 of the transmission are consequently oriented in a suitable position respectively both for their connection to the steering column coming from the steering-wheel and to receive the transverse connecting rod or actuating crank of the steering linkage. On the other hand, the extremely flattened shape of the mechanism which occupies a reduced longitudinal dimension makes it possible to install it easily within the structures of a vehicle.

In the embodiments of FIGS. 1 to 8, the wheel body 6 has in its web at least one and preferably two diametrically opposite symmetrical apertures 21, each in the form of a ring sector and provided with two cylindrical walls 22 coaxial to the pivot axle 5. Located in each aperture 21 is a transverse block forming a partition 24 fixed to the box body 1 and to the cover 3 by a screw 23 passing through these. This block 24 is adjusted hermetically to the inner opposite walls of the box body and the cover against which it is laid and to the cylindrical walls 22 of the corresponding aperture by means of gaskets such as 25. Moreover, the central circular region of the wheel 6 which contains the apertures in question is closed on either side of the wheel by two annular gaskets 26 which interact by leak-proof contact with the inner walls of box body 1 and the cover 3 in such a way that within each aperture 21 there are defined two mutually isolated working chambers 27 and 28 connected by conventional means to the respective distribution passages 16 and 17 of the distributor 12 so as to form the opposite chambers of a double-acting hydraulic power-assistance motor. It will be understood that a pressure of the working fluid within either one of the chambers in question exerts an actuating force on the end lateral surface of the chamber opposite the corresponding radial wall of the fixed block or partition 24.

Another advantage of such an arrangement is that the sliding fit of the bearing 10 on the outer end of the short axle 9 between an end nut 29 and a stack of cup Belleville springs 30 makes it considerably easier to adjust the degree of meshing between the pinion 8 and the toothed wheel 6.

A similar arrangement is encountered again in the alternative form of FIG. 4 which differs from the preceding one only in that the axles 5 and 9 of the wheel and the pinion are parallel, although the characteristic of a conical toothing and a pinion with reduced convergence is nevertheless preserved. In this case, as in the other similar alternative forms, the same reference numerals denote the same elements as in the embodiment of FIGS. 1 to 3.

FIGS. 5 and 6, which illustrate exclusively the lower part of the mechanism, show the provision of limit stops for the wheel 6. The lower portion of the wheel 6 is provided with a curved slot 31 which is coaxial to the axle 5 and the ends of which define the limits of the oscillation travel for the wheel in relation to a neutral position or to a central point where a screw 32 provided with a spacer 33 passes through the slot 31 to be fixed to the box body 1 and to the cover 3. The travel can nevertheless be limited in another way, for example mechanically, by shaping the opposite ends 34 of the peripheral recess 18 of the box in such a way that by interacting with the arm 19 they define the limits of oscillation of this arm 19 fixed to the wheel, or hydraulically by cancelling the hydraulic power assistance by means of grooves 6a and 1a associated with the chambers 27 and 28 and provided respectively in the wheel 6 and in the box body and the cover, so that in the end-of-travel position the two opposite working chambers 27 and 28 of the same aperture 21 communicate with one another.

It is also possible to modify, according to the invention, the arrangement of the output member of the mechanism, for example as shown in FIG. 7.

In this embodiment, which is substantially identical to the preceding ones, the wheel 6 is fixed, for example by splines 35, on a shaft 36 rotatingly mounted on needle bearings 37 in the box 1, 3, one of the ends of the shaft passing through the cover or the body, as the case may be, in such a way as to form a shaft end 38 receiving the eccentric crank of the steering linkage (not shown). In this embodiment, it is, of course, unnecessary for the box formed by the body 1 and the cover 3 to be opened peripherally, as in the preceding cases. On the contrary, it can be closed completely by the corresponding lateral wall portion 39 of the box body 1.

FIG. 8 shows an alternative form of the embodiment of FIG. 1. It differs from this only in that the assembly formed by the input member of the transmission (axle 9) and the associated distributor 12 extends to form an acute angle in relation to the body 1 of the mechanism.

FIGS. 9 and 10 illustrate a mechanism according to the invention made in a sector-shaped form.

Here, the box is formed by joining together, by means of screws received in peripheral holes 44, a flat body 40, a plate forming a cover 41 and an intermediate peripheral piece 42 (which can be made in one piece with the body 40) so as to define a sector-shaped inner cavity 43 with an opening slightly less than 180°. A sector-shaped gear 45 with an opening slightly less than a quadrant is mounted so as to pivot in a leak-proof manner within this cavity, for example by means of splines 46, on an output shaft 47 which is mounted pivotally in the box on bearings 48 and which is prolonged outside the box to end as a member for receiving the crank of the steering linkage (not shown).

The peripheral edge of the sector 45 is provided, over the major portion of its angular extension, with a toothing 49 with which meshes a pinion 50 formed on the output or secondary shaft 51 of the distributor 12, as in the preceding embodiments. Such an arrangement of the input member is similar to that of FIG. 8, except that here the pinion 50 has a conicity oriented in the opposite direction (diverging pinion).

The pivoting sector 45 likewise possesses an inner aperture 52 delimited radially by two cylindrical surfaces 53 which are coaxial to the output shaft 47 and on which tighteningly fits by means of gaskets 54 a transverse block or a partition 55 similar to the preceding partitions 24 and fixed to the box body 40 and to the cover 41 by screws 56. This partition thus defines in the aperture 52 two working chambers 57 and 58 equivalent to the chambers 27 and 28 of the preceding embodiments and which operate in the same way. Gaskets with a closed profile, similar to the preceding gaskets 26, surround the aperture 52 and interact by sliding in leak-proof manner with the inner faces of the box body 40 and the cover 41. The chambers 59 and 60, which are formed externally between the lateral walls of the sector 45 and the walls of the sector-shaped cavity 43, are neutral if it is assumed that this mechanism is to be operated in the same way as that described in relation to FIG. 1, but it is likewise possible to use them for special purposes, for example to increase the hydraulic power assitance from a certain level of input force applied; and with this in view the distributor can be provided with conventional means for connecting in parallel the matching chambers of the two pairs of chambers 59, 57 and 60, 58 respectively or for feeding the matching chambers of each pair sequentially and in a modulated way, for example by means of restrictions variable as a function of the actuating travel of the output member 45 (or of the primary member 13 of the distributor). In this case, it is obvious that the two outer chambers 59 and 60 must be isolated hydraulically from one another, for example by means of gaskets such as 61.

Of course, these characteristics can be applied equally to other embodiments based on the principle of FIG. 1, using the chambers of one of the apertures 21 as main working chambers and the chambers of the other aperture as chambers for increasing the power assistance from a certain degree of rotation of the disc 6 or reaction in the distributor 12.

I claim:

1. A hydraulic power-assisted actuating mechanism comprising a hydraulic distributor having rotatable coaxial primary and secondary distributing members interconnected by a lost-motion coupling permitting a relative angular displacement between said members for feeding selectively at least a pair of antagonistic working chambers of at least one double-acting hydraulic power assistance motor having piston means to be coupled mechanically to a driven system, said primary distributing member being connectable to an actuation control system, wherein said piston means comprises at least a partially disc-shaped piston body having opposite flat outer faces and mounted for rotation about an axis perpendicular to said outer faces, the disc-shaped body mounted in a housng supporting said hydraulic distributor and having flat facing inner faces cooperating in sliding sealing engagement with said outer faces of said piston body, said piston body having peripherally a toothed sector intermeshing with a pinion integral with said secondary distributing member, said piston body being formed with at least one closed transverse aperture in the form of a ring sector centered on said axis of said piston body and having radially spaced arcuate inner faces, and a stationary transverse partition wall extending between said inner faces of said housing through said aperture and having radially opposed faces slidingly and sealingly engaging said inner faces of said aperture so as to define therein said pair of working chambers.

2. A mechanism according to claim 1, wherein said piston body has a projection part extending radially outwardly through a peripheral aperture of said housing for connection with said driven system.

3. A mechanism according to claim 1, wherein said piston body is fixed to an output shaft coaxial with said axis of said piston body, the output shaft rotatingly supported in said housing and sealingly projecting outwardly therefrom for connection to said driven system.

4. A mechanism according to claim 1 wherein said hydraulic distributor has an axis extending angularly with respect to said axis of said piston body.

5. A mechanism according to claim 1, wherein said piston body is of circular outer shape and includes a pair of diametrically opposed apertures each associated with said stationary partition wall.

* * * * *